Mar. 6, 1923. 1,447,883
O. PETERSON
PLOWSHARE
Filed Feb. 3, 1921
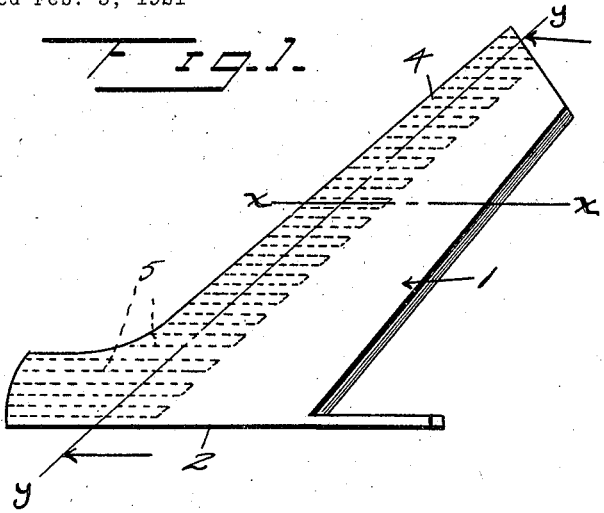
Fig. 1.
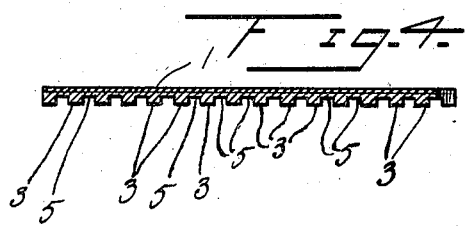
Fig. 4.
Fig. 3.
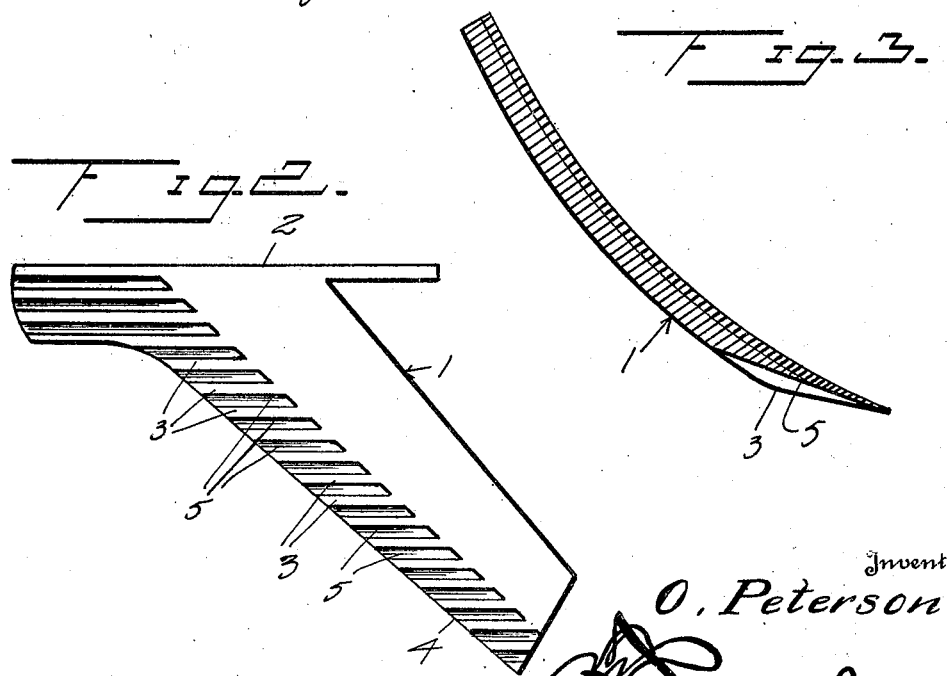
Fig. 2.
Inventor
O. Peterson
By ____ Attorney Patented Mar. 6, 1923.

1,447,883

UNITED STATES PATENT OFFICE.

OLE PETERSON, OF TURNER, OREGON.

PLOWSHARE.

Application filed February 3, 1921. Serial No. 442,131.

*To all whom it may concern:*

Be it known that I, OLE PETERSON, a citizen of the United States, residing at Turner, in the county of Marion and State of Oregon, have invented certain new and useful Improvements in Plowshares; and I do hereby declare the following to be a full, clear, and exact description of the invention, such as will enable others skilled in the art to which it appertains to make and use the same.

It is desirable in the successful operation of plows to provide a share that will maintain a continuous cutting edge, so as to readily pass through the earth and cut roots without becoming clogged or fouled, said share being self-sharpening and presenting an upper hard surface for the earth to slide over, a tough body portion to resist strain and fracture, and having a lower wearable surface which yields to the abrasive action of the earth in the operation of the plow, whereby to preserve a sharp cutting edge, said share having its lower surface presenting grooves and ribs in alternation and parallel with one another and with the land side of the plow and lying in the line of draft.

This invention provides a plow share of the character aforesaid possessing all the stated requisites and capable of being manufactured and marketed at substantially the same cost as the ordinary plow share which requires sharpening and dressing at given periods in order to operate efficiently and satisfactorily.

For a full understanding of the invention and the merits thereof reference is to be had to the following description and the drawings hereto attached, in which:

Figure 1 is a top plan view of a plow share embodying the invention,

Figure 2 is a view of the plow share inverted,

Figure 3 is a vertical longitudinal section on line X—X of Figure 1, and

Figure 4 is a transverse section on the line Y—Y of Figure 1.

Corresponding and like parts are referred to in the following description and designated in the several views of the drawings by like reference characters.

The plow share as a whole is designated by the reference numeral 1 and embodies a land side 2 and a blade 4. The configuration of the plow share may be of any ordinary form best adapted for the particular use intended. A plow share constructed in accordance with this invention has its upper surface hardened or tempered so as to resist wear and present a smooth polished surface for the earth to readily slide over. The body of the plow is relatively soft and tough so as to resist stress and strain and obviate fracture. The lower or under surface of the plow share is relatively soft so as to wear away by abrasive action with the earth. This is essential in order to preserve a cutting edge. A plurality of grooves 5 and ribs 3 are formed in the under surface of the plow share in alternation and extend parallel with one another and with the land side so as to lie in the line of draft. These grooves and ribs lend stability to the plow when in operation and compensate for side draft. The grooves 5 taper throughout their length. The forward ends of the grooves vanish into the cutting edge of the plow share. As a result of this construction, the cutting edge is continuous and practically straight and does not present any wave outline which would tend to collect trash and cause the plow to foul when in operation. The diminished surface presented by the lower faces of the ribs results in a wearing away of the under side of the plow share in such ratio as to insure and maintain a sharp cutting edge. Moreover, the ribs strengthen and reinforce the plow share. The ribs and grooves cooperate to neutralize and prevent side draft.

From the foregoing it will be understood that a plow share constructed in accordance with this invention presents an upper hard, wear resisting surface and a lower wearable surface, the main or body portion of the share being tough so as to resist strains and stresses and obviate fracture. The upper or top surface of the plow share may be case hardened or tempered in any manner. The point like the body of the share is formed in its under side with ribs and grooves. This enables the point to maintain its given shape and prevents rounding thereof. As a result the plow holds in the ground and is prevented from riding thereout. It should be emphasized that the construction is such as to preserve and maintain a continuous cutting edge which is essential. The forward tapering or vanishing of the grooves and ribs enables a continuous cutting edge to be preserved. By having the cutting edge continuous and smooth there is no tendency to collect trash or for the plow to foul. The upper surface of the plow share being hard maintains a polish, hence the earth will slide thereover with a minimum resistance. The under surface being relatively soft wears away by abrasive action. The body portion being tough enables the plow share to withstand strain without becoming fractured.

What I claim is:

1. A plow share having a substantially concaved soil penetrating blade, the active surface of said blade being tempered and polished to facilitate sliding of the soil thereover, a backing on said blade at the soil penetrating edge whereby the undersurface of the blade will be worn away by abrasive contact with the soil to afford a self sharpening share, said backing being of a material less resistant to said abrasive action than the cutting edge of the blade to insure removal of the under surface of the blade in the rear of the cutting edge in substantially the same ratio as at said cutting edge, ribs on the backing plate adjacent the cutting edge of the blade, and said ribs being spaced apart and substantially tapered and vanishing at said edge.

2. A plow share having a blade concaved terminating at the soil penetrating edge in a substantially horizontal plane, the upper surface of said blade being tempered and polished to facilitate sliding of the soil thereover, a backing on the under surface of the blade of softer material than the blade at said edge, and ribs on the body of softer material than said edge directly engaging the ground and parallel to the line of draft, and said ribs being tapered to vanish adjacent said edge.

In testimony whereof I affix my signature in presence of two witnesses.

OLE PETERSON.

Witnesses:
WALTER PETERSON,
L. PORTER.